United States Patent
Baylon et al.

(10) Patent No.: US 8,068,175 B2
(45) Date of Patent: Nov. 29, 2011

(54) METHOD FOR DETECTING INTERLACED MATERIAL AND FIELD ORDER

(75) Inventors: David M. Baylon, San Diego, CA (US); Kevin M. McKoen, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 830 days.

(21) Appl. No.: 11/962,880

(22) Filed: Dec. 21, 2007

(65) Prior Publication Data

US 2008/0100750 A1 May 1, 2008

Related U.S. Application Data

(62) Division of application No. 11/025,029, filed on Dec. 29, 2004, now Pat. No. 7,450,180.

(51) Int. Cl.
*H04N 5/08* (2006.01)
(52) U.S. Cl. ......................... 348/526; 348/558
(58) Field of Classification Search .......... 348/441–459, 348/706, 705, 558, 555, 526
See application file for complete search history.

(56) References Cited

U.S. PATENT DOCUMENTS

| | | | | |
|---|---|---|---|---|
| 6,118,491 A | * | 9/2000 | Wu et al. | 348/526 |
| 6,430,223 B1 | * | 8/2002 | Lim | 375/240.16 |
| 6,512,881 B1 | * | 1/2003 | Kinebuchi et al. | 386/68 |
| 6,934,335 B2 | * | 8/2005 | Liu et al. | 375/240.16 |

* cited by examiner

*Primary Examiner* — Michael Lee
(74) *Attorney, Agent, or Firm* — Stewart M. Wiener

(57) ABSTRACT

Field order in a sequence of video frames is determined based on magnitude or relative motion of a motion vector between a bottom field of a current frame and a top field of a next frame, and magnitude or relative motion of a motion vector between a top field of the current frame and a bottom field of the next frame. Field order of two interlaced frames of a video sequence is determined by assembling two new frames from the two interlaced frames by combining a bottom field of the first frame with a top field of the second frame and by combining a top field of the first frame with a bottom field of the second frame. The field order is top field first if the number of zipper points in the first new frame is smaller than the number of zipper points in the second new frame.

9 Claims, 12 Drawing Sheets

EXEMPLARY EMBODIMENT OF 6-POINT ZIPPER
FILTER (ACROSS FIELDS)

| SEQUENCE | FORMAT AND SCAN | NUMBER OF FRAMES | MIN p | MEAN p | MAX p | DETECTED SCAN | CORRECT DETECTION? |
|---|---|---|---|---|---|---|---|
| TEMPETE | 720x480I | 260 | 0.00145 | 0.19517 | 1.03385 | I | YES |
| RUGBY | 720x576I | 220 | 0.59317 | 2.01449 | 4.66676 | I | YES |
| FOOTBALL | 720x480I | 260 | 0 | 1.38233 | 3.86748 | I | YES |
| F1CAR | 720x576I | 220 | 0.02098 | 1.48739 | 6.39154 | I | YES |
| CANOA | 720x576I | 220 | 0.10368 | 0.32771 | 0.69854 | I | YES |
| BUS | 720x480I | 150 | 1.80440 | 3.97183 | 5.09664 | I | YES |
| AKIYO | 352x240P | 300 | 0 | 0.00012 | 0.00237 | P | YES |
| BUS | 352x288P | 150 | 0 | 0 | 0 | P | YES |
| AKIYO | 352x480I | 150 | 0 | 0.00013 | 0.00355 | P | NO |
| FOREMAN | 352x288P | 150 | 0.00197 | 0.00539 | 0.02565 | P | YES |
| MOT_DGHTR | 352x288P | 300 | 0 | 0 | 0 | P | YES |
| MOBILE | 352x288P | 250 | 0.07102 | 0.12760 | 0.20616 | I | NO |
| HALL | 352x240? | 330 | 0.24740 | 0.27148 | 0.29474 | I | ? |
| WEATHER | 320x240? | 300 | 0.14974 | 0.23495 | 0.35026 | I | ? |
| JAMES | 528x480M | 1301 | 0 | 0.70860 | 28.15775 | I/M | YES |

TABLE 1: SEQUENCE DETECTION RESULTS
(I = INTERLACED, P = PROGRESSIVE, M = MIXED, ? = UNKNOWN)

*FIG. 2*

| SEQUENCE | FORMAT AND SCAN | NUMBER OF FRAMES | MIN p1/p2 | MEAN p1/p2 | MAX p1/p2 | DETECTED FIRST FIELD | CORRECT DETECTION? |
|---|---|---|---|---|---|---|---|
| BUS | 720x480I | 150 | 1.84028<br>3.03009 | 3.94396<br>5.08218 | 4.97454<br>7.01910 | T | YES |
| FOOTBALL | 720x480I | 260 | 0<br>0 | 4.18381<br>1.38900 | 8.93808<br>3.65625 | B | YES |
| CANOA | 720x576I | 220 | 0.10079<br>0.64429 | 0.33778<br>1.79743 | 0.82128<br>3.86429 | T | YES |
| F1CAR | 720x576I | 220 | 0.04533<br>0.30430 | 1.49386<br>3.56536 | 11.75540<br>10.95679 | T | YES |
| RUGBY | 720x576I | 220 | 0.53193<br>2.46287 | 1.96658<br>5.46249 | 4.76948<br>9.60021 | T | YES |
| TEMPETE | 720x480I | 260 | 0.11053<br>0.00116 | 0.59793<br>0.18231 | 1.59201<br>0.90799 | B | YES |
| JAMES | 528x480M | 1301 | 0<br>0 | 0.82571<br>2.14244 | 35.46086<br>34.84691 | T | YES |

TABLE 3: SEQUENCE DETECTION RESULTS
(I = INTERLACED, M = MIXED, T = TOP FIELD, B = BOTTOM FIELD)
THE TWO MEASURED p1/p2 VALUES WITHIN A BOX CORRESPOND TO THE ASSUMPTION OF TOP FIELD (TOP VALUE) OR BOTTOM FIELD (BOTTOM VALUE) FIRST

FIG. 3

| FRAME NUMBER | 0 | 1 | 2 | 3 | 4 |
|---|---|---|---|---|---|
| p1 | 0 | 0 | 0 | 2.122 | 2.010 |
| p2 | 1.898 | 2.977 | 1.684 | 2.140 | 2.021 |

TABLE 4. MEASURED ZIPPER POINT PERCENTAGES p1 AND p2 FOR A FIVE FRAME PERIOD IN THE JAMES TELECINE SEQUENCE

*FIG. 4*

EXEMPLARY EMBODIMENT OF 6-POINT ZIPPER FILTER (ACROSS FIELDS)

METHOD FOR DETECTING INTERLACED MATERIAL AND FIELD ORDER

This application is a divisional of and claims priority to U.S. application Ser. No. 11/025,029 filed on Dec. 29, 2004, now U.S. Pat. No. 7,450,180, which is incorporated herein by reference.

FIELD OF THE INVENTION

The present invention relates generally to methods and apparatuses for processing data, and more particularly to a method and apparatus for processing video data.

BACKGROUND

With the multitude of scanning, transmission and display formats, it becomes increasingly likely that material generated for a targeted application display will end up being shown on other display devices with differing capabilities. This may be the case for spatial resolution, amplitude resolution, color resolution, frame rate, scanning format, etc. Alternatively, a given display device may end up having to show materials which differ in these aspects. Streaming video applications is one example where this might occur. Historically, interlaced and progressively scanned material has been targeted for different applications. However, video streaming applications have led to cases where both interlaced and progressive material are shown using only one display scan format. Video streamed to a progressively scanned PC display may consist of a combination of television and film content, or interlaced and progressive material.

How to best display interlaced material on progressive scan displays or vice-versa is a difficult problem and has been the subject of many de-interlacing, subsampling, interpolation, and frame-rate change, etc. studies. What further complicates the problem in the streaming video case is the fact that it is often not known whether the streamed material is progressive or interlaced to begin with. During a movie segment the material may be progressive scan, but during commercials the content may switch to interlaced format.

Because the streamed video data may not always convey the correct scanning information (if at all), it may be useful to be able to deduce the scanning format from the raw video itself. Due to the existence of (bad) edits in the material, the fact that interlaced material is often assembled into frames using two consecutive fields, etc. makes a method for automatically determining scan format useful. Moreover, even film material which has undergone field pulldown will have a mixture of both progressive and interlaced-like content.

In addition, for display, compression, or processing of interlaced material, it is important that correct timing of fields be maintained. If the top and bottom fields of interlaced material are not displayed in the proper order, severe visual artifacts can occur especially for high motion scenes. Displaying fields in reverse order results in data not being shown in chronological order. If compression or processing of interlaced material uses temporal motion models, then maintaining correct chronological order of fields is important. Otherwise, compression efficiency or video quality may be sacrificed.

In many traditional video applications, the proper field order can be obtained from some temporal side information stored or transmitted with the interlaced video. However, in today's emerging and converging world of television and Internet streaming video, it becomes increasingly possible that information about field order is lost or not known. Interlaced video may be processed for both interlaced and progressive display, and it may undergo some editing operations which may alter the display order of the fields. In some cases, only the raw interlaced video data may be known and information about the field order may not be given.

The present invention is therefore directed to the problem of developing a method and apparatus for automatically detecting the correct field order from only the interlaced video data, without any side information knowledge except for the spatial resolution, as well as for differentiating between progressive and interlaced material using the video content itself.

SUMMARY OF THE INVENTION

The present invention solves these and other problems by employing a zipper filter to identify motion artifacts present in the frame of the video thereby enabling a determination to be made as to whether the frame was originally scanned using a progressive scanning format or an interlaced scanning format. Once identified as an interlaced scanning format, the present invention further employs the zipper filter to determine the field order of the frames by examining the same motion artifacts.

According to one aspect of the present invention, an exemplary embodiment of a method for determining a scanning format of a frame of a video signal includes determining if any interfield motion exists within the frame and indicating that the frame is interlaced scanned if interfield motion is detected.

According to another aspect of the present invention, an exemplary embodiment of a method for determining a scanning format of a frame of a video signal includes filtering each pixel in the video frame using a shift-invariant vertical zipper filter and calculating a percentage of a plurality of output filtered absolute values above a first predetermined threshold. The frame is declared to be interlaced scanned if the percentage exceeds a second predetermined threshold and progressive scanned if the percentage lies below the second predetermined threshold.

According to still another aspect of the present invention, an exemplary embodiment of a method for determining a field order includes calculating a first magnitude of a motion vector between a bottom field of a current frame and a top field of a next frame, calculating a second magnitude of a motion vector between a top field of the current frame and a bottom field of the next frame and determining the field order based on the first and second magnitudes.

According to yet another aspect of the present invention, an exemplary embodiment of a method for determining a field order includes assigning one of the two interlaced frames to be a first frame and the other of the two interlaced frames to be a second frame and assembling two new frames from the two interlaced frames by combining a bottom field of the first frame with the top field of the second frame and by combining a top field of the first frame with a bottom field of the second frame. The number of zipper points is determined in each of the two new frames and if the number of zipper points in the first frame is smaller than the number of zipper points in the second frame, that the field order of the two frames is top field first, and if the number of zipper points in the first frame is larger than the number of zipper points in the second frame, that the field order of the two frames is bottom field first.

BRIEF DESCRIPTION OF THE DRAWINGS

FIGS. 2-3 depict Tables 1 and 3, respectively, which show sequence detection results from testing an exemplary embodiment of the present invention for detecting scanning format and/or field order.

FIG. 4 shows Table 4, which depicts test results from testing an exemplary embodiment of the present invention for detecting field order.

DETAILED DESCRIPTION

Figure 1:
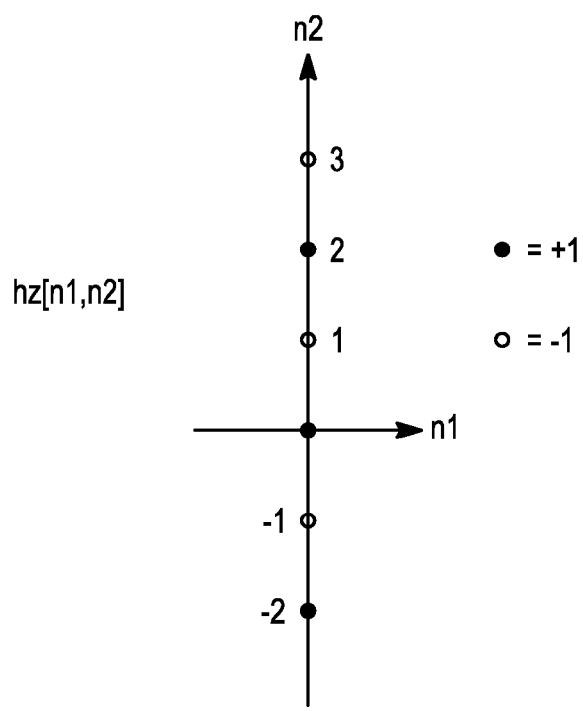
FIG. 1 depicts an exemplary embodiment of a six-point zipper filter according to one aspect of the present invention.

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Although some video spatial resolutions are often associated with a particular scan format, e.g., 720×480 interlaced, the method presented here does not rely upon the video spatial resolution to determine the scan format. According to certain aspects of the present invention, information about whether the scan format of the material is interlaced or progressive can be potentially useful in a variety of ways, including the following:

Interlaced/progressive display: To indicate whether the material is best suited for either display scan format;
De-interlacing: To indicate whether conversion of interlaced material to progressive format is necessary for progressive display;
Re-sizing: To indicate how the material should be re-sized, since interpolation or decimation algorithms for progressive and interlaced material can be quite different, producing drastically different and often poor results if not applied properly;
Inverse pulldown: To help in (i) detecting whether film material may have undergone frame or field pulldown, and (ii) performing inverse field pulldown by detecting which frames have interlaced scan structure;
Field edit scene change detection: To help in detecting "bad" field edits in a scene cut; and
Frame/field coding: To help in determining whether a given frame (or portion of a frame) should be coded using a progressive/frame or interlaced/field structure (as is supported in many compression standards), thereby serving as a fast mode decision alternative to rate-distortion coding techniques which often optimally but exhaustively (time and processor intensive) encode the video assuming both scanning formats.

EXEMPLARY EMBODIMENT

Herein it is assumed that a frame of video data consists of either one progressively scanned frame or two interleaved field scans, and the problem is to determine whether the frame scan format is interlaced scan or progressive scan. Of course, it may be argued that if the frame was known to consist of interleaved fields in the first place, then the video must be interlaced. However, it is often the case that a frame or sequence is given (such as output from some video capture device) without knowledge of the original scanning format or timing. Certainly herein, it is assumed that such information is not known. Even in the commonly used field pulldown operation, frames in the pulldown sequence contain both progressive and interlaced type of content.

With these assumptions, detecting whether a given frame is progressive or interlaced is analogous to determining whether the frame contains one "time instance" (progressive case) or two "time instances" (interlaced case).

Figure 5:
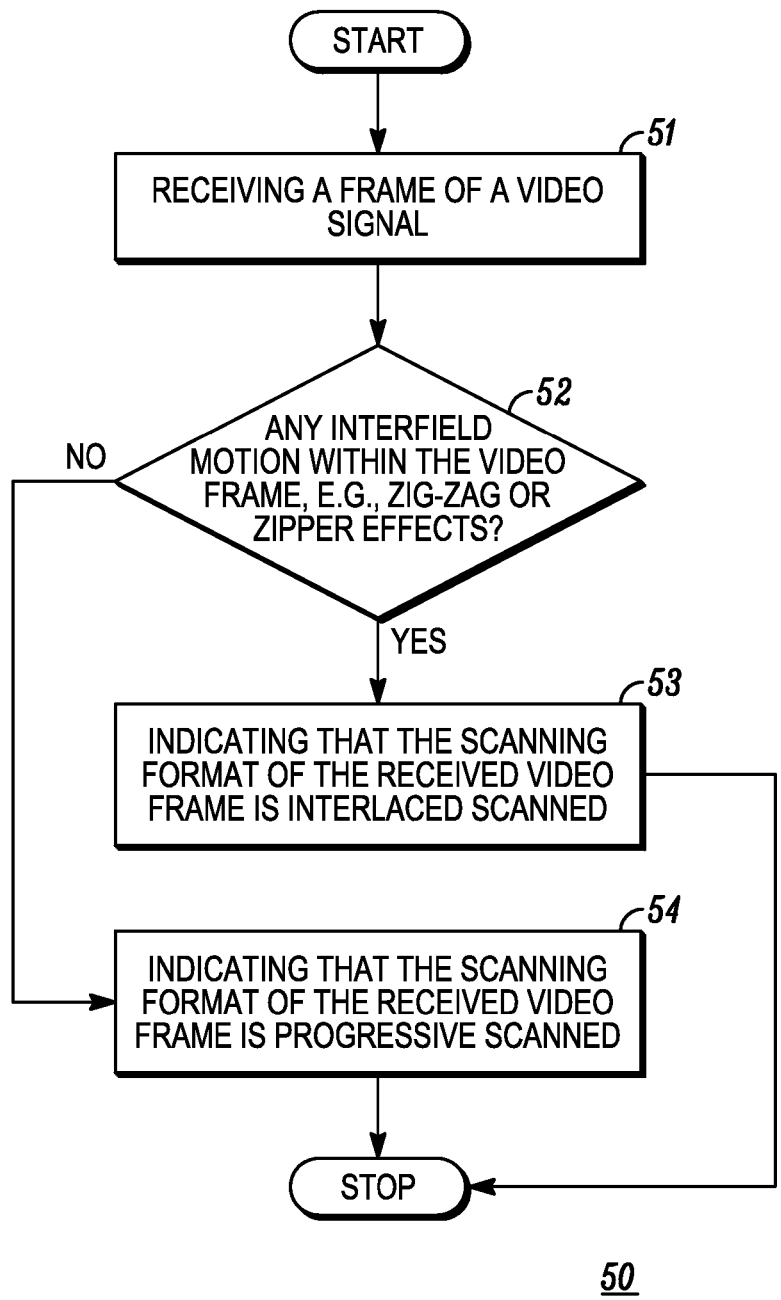
FIG. 5 depicts an exemplary embodiment of a method for detecting scanning format of a frame of a video sequence according to another aspect of the present invention.

Turning to FIG. 5, shown therein is an exemplary embodiment 50 of a method for determining a scanning format of a frame of a video signal. According to one aspect of the present invention, the exemplary embodiment 50 of the method for determining whether a given frame is progressive or interlaced detects whether or not there is any interfield motion. Thus, in element 51, the exemplary embodiment 50 receives a frame of the video signal, and in element 52 then first determines whether any interfield motion exists. The presence of such interfield motion indicates that the frame was probably interlaced scanned, whereas the absence probably indicates that the frame was progressive scanned. Thus, in element 53, the exemplary embodiment indicates that the received frame was interlaced scanned as interfield motion was detected in element 52, whereas in element 54 the exemplary embodiment indicates that the received frame was progressive scanned as no interfield motion was detected in element 52.

However, with this embodiment, for a truly static scene, as progressive and interlaced scans ideally yield the same frame picture, it would be difficult to distinguish between the two cases. Fortunately though, because these cases are indistinguishable, in the absence of motion the impact of an incorrect detection is small.

The embodiment above checks for interfield motion. With the assumption that typical video tends to have a high degree of spatial and temporal correlation (especially for typical objects and motions), we would expect that for progressively scanned material, there should be some spatial correlation within and around the edges of objects. However, for interlaced scanned material, moving objects exhibit the well known "zigzag" or "zipper" effects near the edges, with a more pronounced effect the larger the (interfield) motion. Motion between fields and/or near edges should then provide some clues as to the scanning pattern. Although it is possible to perform the detection based on multiple frames, for simplicity the following proposed approach focuses on detection using a single frame only. Thus, in element 52, the determination as to the presence of interfield motion is based on the spatial correlation within and around edges of objects. The determination as to the presence of interfield motions can include identifying zig-zag or zipper effects near one or more edges of one or more objects in the frame. Note that interlace detection can be determined for individual frames or for a group of frames. If it is assumed that a given video sequence is known to be either consistently progressive or interlaced within the sequence, then the detection will generally be more reliable when performed over more frames.

Figure 6:
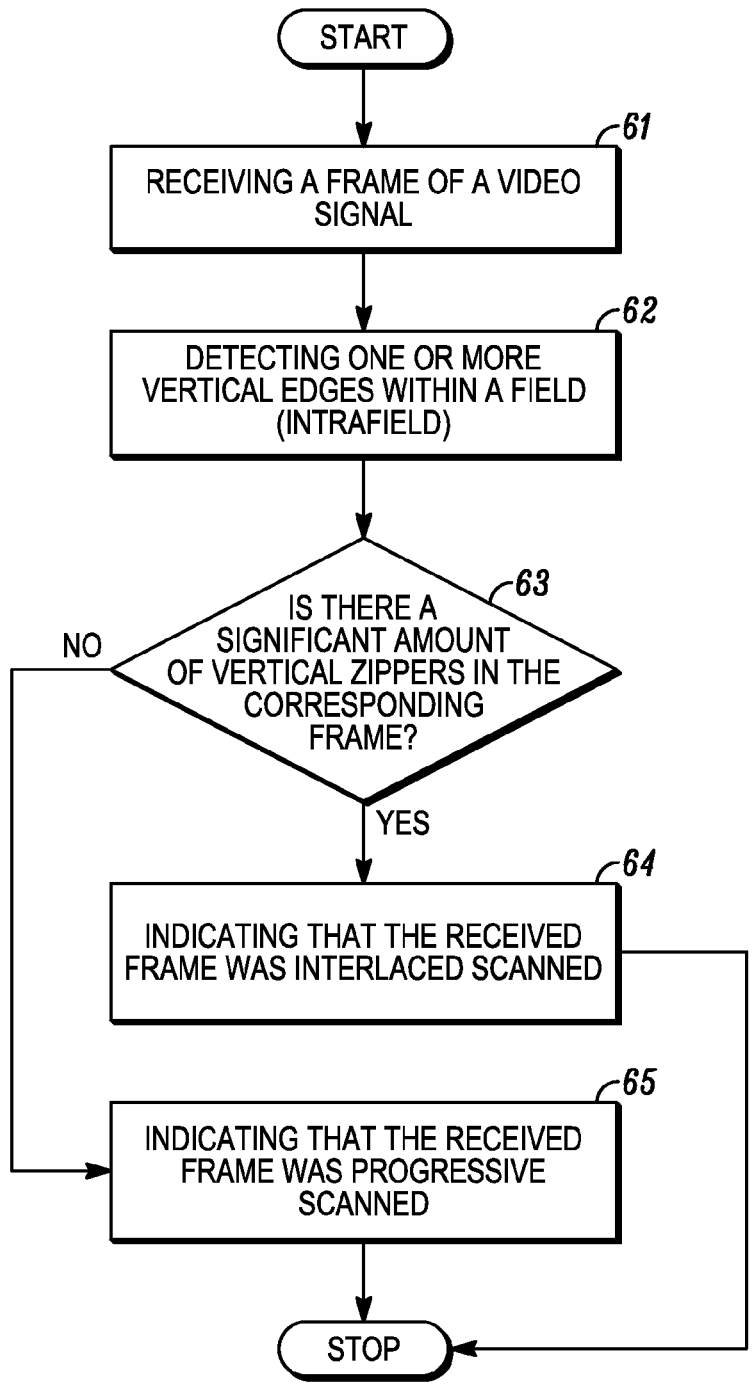
FIG. 6 depicts another exemplary embodiment of a method for detecting scanning format of a frame of a video sequence according to yet another aspect of the present invention.

Turning to FIG. 6, shown therein is another exemplary embodiment 60 of a method for determining the scanning format of a frame of a video signal. According to this exemplary embodiment 60, to determine if the frame was interlace scanned, the exemplary embodiment: (1) looks for vertical edges by performing standard vertical edge detection within a field (intrafield), such as using gradient-based methods; and then: (2) checks in the vertical edge regions as to whether there are any vertical zippers in the corresponding frame. A frame with a significant amount of vertical zippers would be viewed as an interlaced frame; otherwise, the frame would be detected as progressive.

Thus, a frame of a video signal is received in element 61. Next, in element 62, the exemplary embodiment 60 then performs edge detection to detect one or more vertical edges within a field (intrafield) of the video frame. The exemplary embodiment 60 then determines whether a significant amount of vertical zippers exist in the corresponding frame in element 63. If so, in element 64, the exemplary embodiment indicates that the frame was interlaced scanned. If not, in element 65, the exemplary embodiment indicates that the frame was progressive scanned.

Figure 7:
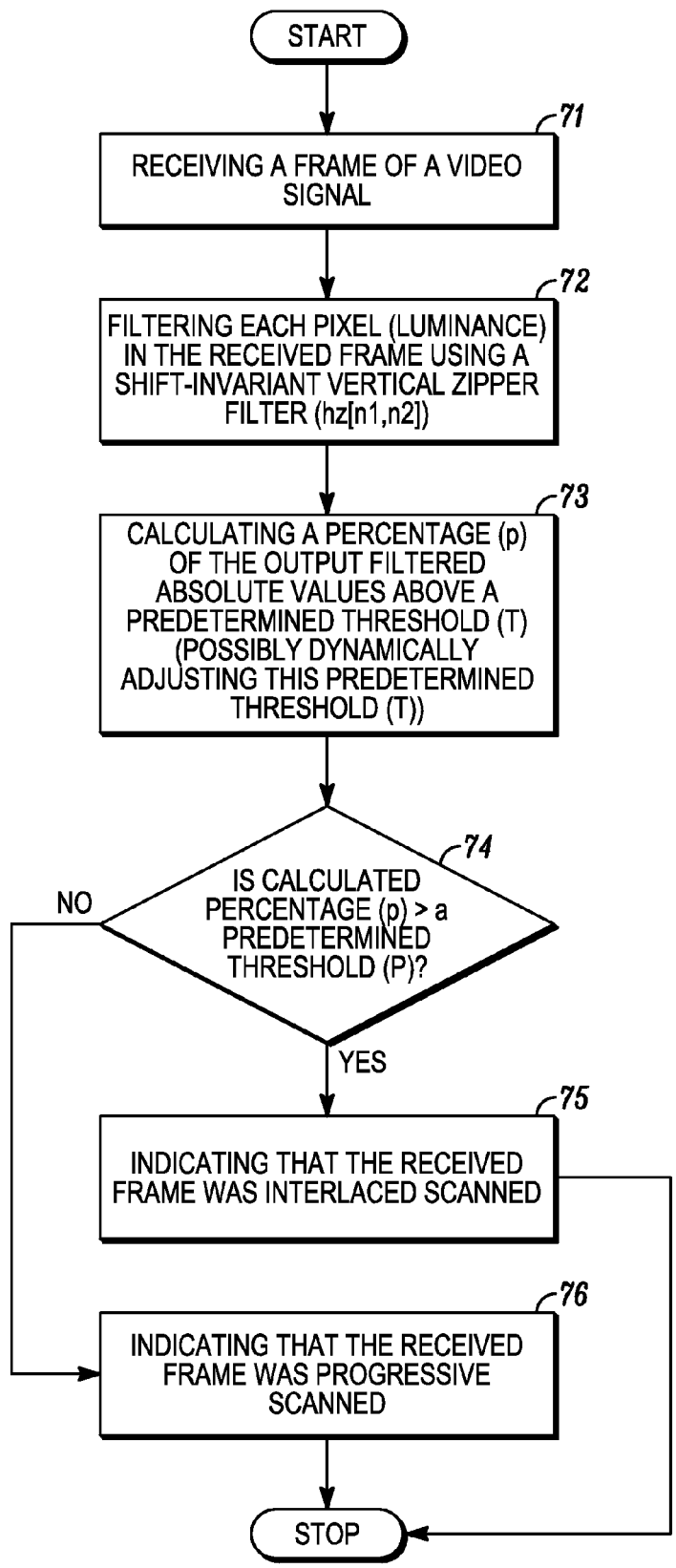
FIG. 7 depicts still another exemplary embodiment of a method for detecting scanning format of a frame of a video sequence according to still another aspect of the present invention.

According to another aspect of the present invention, another exemplary embodiment of the present invention shown in FIG. 7 omits step (1) and performs only step (2). In this exemplary embodiment 70, (known as the "zipper filter" approach for interlaced detection), a frame of a video signal is received in element 71. Upon receipt, in element 72 each pixel (e.g., luminance) in the frame is filtered using a shift-invariant vertical zipper filter $hz[n1,n2]$, such as that shown in FIG. 1 (which depicts an exemplary embodiment of a six point zipper filter). In FIG. 1, n1 represents the horizontal direction and n2 represents the vertical direction (across fields). In element 73, the percentage (p) of the output filtered absolute values above a predetermined threshold (T) is calculated. In element 74, it is determined whether the calculated percentage (p) is greater than another predetermined threshold (P). If so, in element 75 the received frame is indicated to have been interlace scanned. If not, in element 76 the received frame is indicated to have been progressive scanned (or possibly progressive scanned). For the case where the percentage (p) is equal to a predetermined threshold (P), the frame or group of frames can be determined to be either progressive or interlaced. For example, this decision can be made to be the same as the most recently detected frame or group of frames. Likewise, if a given output filtered absolute value is equal to a predetermined threshold (T), one reasonable approach may be to specify the output to be a "zipper point" in half of the cases.

Figure 12:
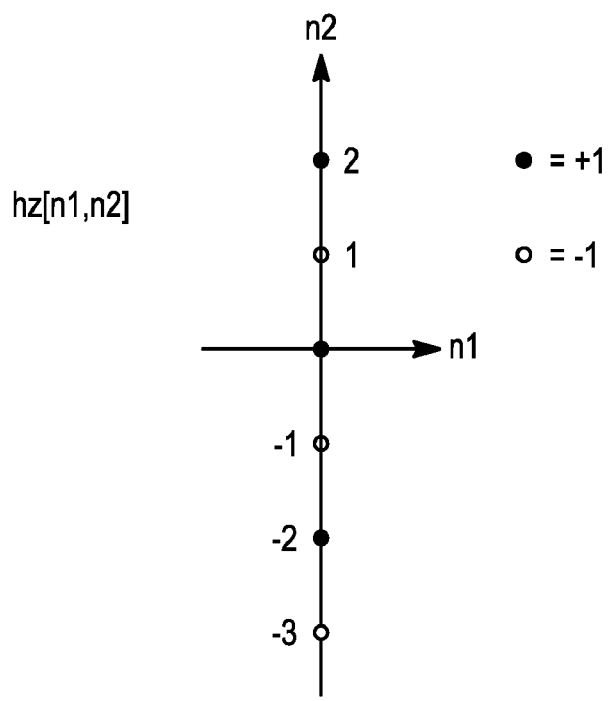
FIG. 12 depicts another exemplary embodiment of a six-point zipper filter according to another aspect of the present invention.

There are many possible variations on the above exemplary embodiments. For example, the predetermined thresholds T and P can be adjusted dynamically or to suit the application. Moreover, there are many possible variations on the basic zipper filter, such as its length, width (e.g., a wider filter with the same vertical columns), orientation, phase or offset. Another exemplary embodiment of a six point zipper filter is shown in FIG. 12. In general, the zipper filter detects the interlaced zigzags across fields, which would typically result from interfield motion as opposed to actual progressive content. Also, the above exemplary embodiments can be applied to each candidate frame, frame partition, group of frames, or to the entire sequence.

An alternate interpretation of the zipper filtering can be given as follows. If the two fields are separated into different "frames" (each now with half the vertical resolution), then the zipper filter in FIG. 1 can effectively be viewed as taking the sum of differences between three vertical pixels in the two frames. Note that the sum of differences is taken instead of absolute differences, as the latter would allow other "zipper patterns" which may not be attributable to an interlaced scanning pattern. One feature of the zipper filter approach is that it provides a measure of interfield motion with relatively low computation requirements.

Figure 11:
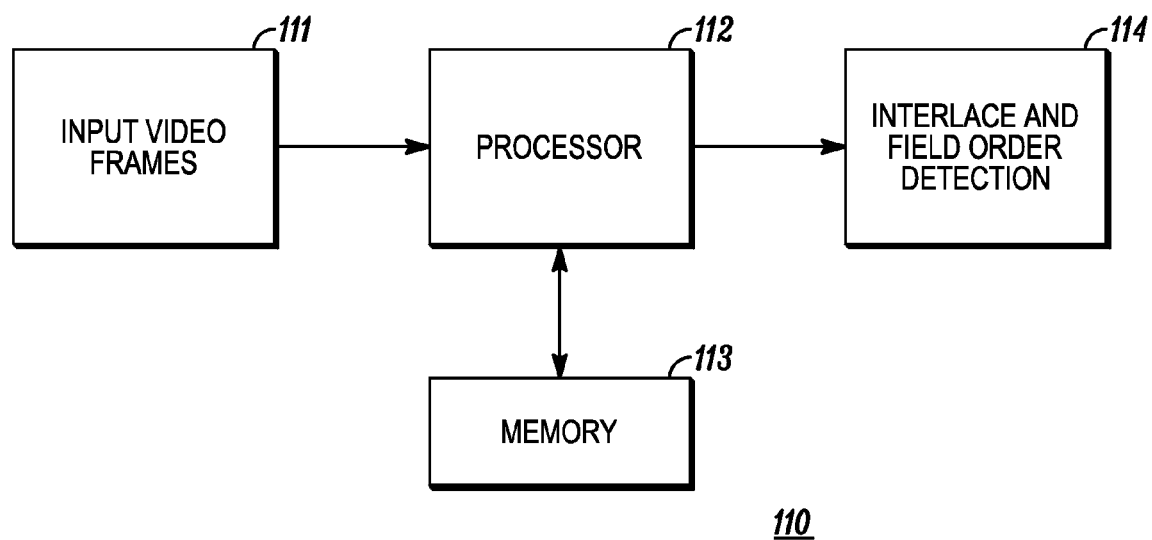
FIG. 11 depicts apparatus for detecting interlaced material and field order.

Turning to FIG. 11, shown therein is apparatus 110 for detecting interlaced material and field order. Video frames 111 are input to a processor 112 and the video data is stored in memory 113. The processor 112 executes the zipper filtering operation and detection algorithm and outputs the detection results 114. The same apparatus 110 can be employed to perform field order detection methods described below.

Results

To illustrate the performance of basic method, simulations of the basic proposed approach were performed on several interlaced, progressive, mixed scan, and unknown scan sequences. The thresholds were chosen to be fixed at $T=3*75$ (giving an average pairwise pixel edge step of $75/255 \approx 29\%$) and $P=0.05(\%)$, and these were applied to each frame as well as over the entire sequence. The results over the entire sequence are shown in Table 1, where the minimum, mean, and maximum frame percentages (p) are given. The percentage threshold (P) was applied to the mean measured frame value (p).

The method yields fairly reasonable results, especially for the sequences which have strong interfield motion, such as Bus, Rugby, F1car, and Football. For interlaced sequences which lack significant zipper effects, like the low motion Akiyo sequence, detection is less accurate. However, as mentioned previously, the effect of improper detection may be small. For example, if the interlaced Akiyo sequence were encoded using progressive scan tools (as the proposed method with the above thresholds indicates), the impact on coding efficiency would be small (if not improved).

Based upon the results, the above threshold for P is somewhat biased towards interlaced detection, but can be adjusted depending on the material and/or the application. The progressive Mobile sequence has high spatial detail that is incorrectly detected as interlaced zippers. It is possible that this sequence (as well as some of the other progressive sequences) may have been artificially generated by dropping a field from an interlaced version without vertical pre-filtering, thereby maintaining the high vertical detail. Based on the above results, a reasonable percent threshold value for compression applications might be around $P=0.3$. Note also that the detection can be performed over a sub-picture region, which might be useful for coding applications. It is not known whether the Hall and Weather sequences are interlaced or progressive. Even if they are interlaced, they might be considered as "weakly interlaced" (look at the small and narrow range of p values), and therefore it may be reasonable to treat them as progressive sequences.

Finally, the James sequence is known to be a sequence with field pulldown. When the proposed method is applied, the expected repeated pattern of three progressive frames followed by two interlaced frames is observed. Furthermore, the observed large p frame values—such as around 28, 19, and 16—corresponded to frames that had fields from two different scenes. This illustrates how the method can be used to detect these "bad" field edits occurring at a scene cut.

Exemplary Embodiment of Method for Determining Field Order

According to one aspect of the present invention, an exemplary embodiment for determining field order analyzes motion flow of edges across fields. To illustrate this, let "t" denote the top field and "b" denote the bottom field. Let the first eight frames of a top field first sequence and a bottom field first sequence be top first=(0t, 0b, 1t, 1b, 2t, 2b, 3t, 3b, 4t, 4b, 5t, 5b, 6t, 6b, 7t, 7b, . . . ) and bottom first=(0b, 0t, 1b, 1t, 2b, 2t, 3b, 3t, 4b, 4t, 5b, 5t, 6b, 6t, 7b, 7t, . . . ).

If we let one unit (+1) be the time from two adjacent fields in correct order, then the sequence of the time differences between fields displayed in the correct order is correct order=(+1, +1, +1, +1, +1, +1, +1, . . . ).

On the other hand, the sequence of time difference between fields displayed in the wrong order is incorrect order=(−1, +3, −1, +3, −1, +3, −1, . . . )

So for a sequence that contains objects having a smooth motion flow (for example), if the fields are displayed properly, then the "correct order" motion flow should be detected. However, if the fields are not displayed properly, then the "incorrect order" motion flow should be detected.

Assuming that typical video content exhibits a smooth motion flow across fields more than a jerky forward-backward regular motion across fields, one exemplary embodiment for detecting field order is to initially assume that the top field is first. If the "incorrect order" motion flow is detected, then the sequence should be set as a bottom field first sequence instead.

What remains is the task of determining the motion flow of the sequence. The following is one method for doing so:

1. Field order detection problem: Given an interlaced sequence of frames with known spatial resolution, determine whether the top or bottom field is temporally first in a frame.

2. For simplicity, arrange frames into fields (so as to generate field-based frames), with the initial assumption that the top field is first.

3. Analyze the motion flow of edges of moving objects throughout a set of fields.

a. Specify a blocksize resolution for analyzing motion flow.

b. For each block within a current field-based frame, identify the blocks with strong edges by performing edge detection (e.g., spatial edge detection).

c. For those edge blocks in the current field-based frame, examine its forward and backward motion for a certain number of frames. This may be done, for example, by performing full search block matching of the block in a future field-based frame, and then repeating the procedure for the best-found block in the future frame for the second future frame, etc. The same is done for the backward motion search.

d. For blocks with large motion (large motion vector magnitude), store the motion vector flow across the field-based frames.

e. If the motion flow has the "incorrect order" pattern, then the assumption of top field first should be changed to bottom field first.

This is one possible approach for detection using motion analysis; however, the motion estimation may require significant computation. The next section outlines another approach that requires less computation but still appears promising.

Alternative Embodiment of Method for Determining Field Order

Figure 8:
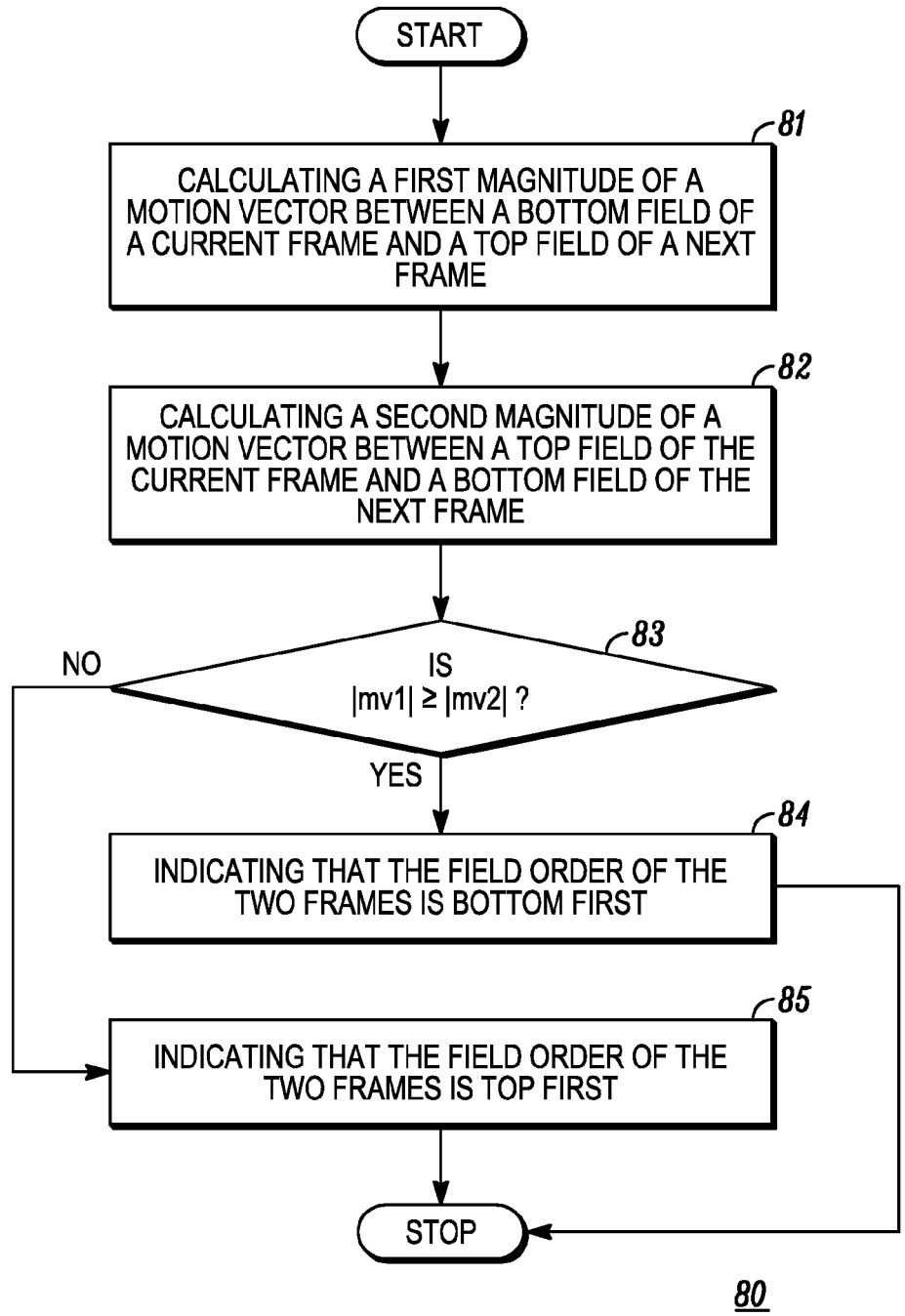
FIG. 8 depicts an exemplary embodiment of a method for detecting field order from two frames of a video sequence according to still another aspect of the present invention.

With a motion analysis approach, performance is expected to improve with more frames of data and with high motion. Correct detection is difficult for low motion sequences, but in these cases the consequences of an incorrect decision may be small. In general, more than one frame of data is needed for detection, since a single frame contains only one time instance of each field. Turning to FIG. 8, shown therein is an exemplary embodiment 80 for determining field order that uses at least two frames of data to perform detection, and is based upon the interlace detection approach described above. Note that field order detection can be determined for individual frames or for a group of frames. If it is assumed that a given video sequence is known to be consistently either top field first or bottom field first within the sequence, then the detection will generally be more reliable when performed over more frames.

Consider two consecutive frames—curr(0) and next(1)—and their respective fields: curr_top(0t), curr_bot(0b), next_top(1t), next_bot(1b). Recall that the temporal order of these fields under the assumption of top or bottom field first will be top first=(0t, 0b, 1t, 1b) and bottom first=(0b, 0t, 1b, 1t).

Let "motion (i, j)" indicate the relative amount of motion between i and j. Assuming typical object motion, then for top field first sequences, it might be expected that because of the smaller temporal interval, that there is less object displacement between (0b, 1t) than between (0t, 1b). On the other hand, for bottom field first sequences, it might be expected that there is less object displacement between (0t, 1b) than between (0b, 1t). That is, top first: motion(0b, 1t)<motion(0t, 1b)

bottom first: motion(0b, 1t)>motion(0t, 1b).

Therefore, exemplary embodiment 80 detects the field order by comparing motion (0b, 1t) with motion (0t, 1b) and uses the above "rule."

Thus, in element 81, exemplary embodiment 80 calculates a first magnitude of a motion vector between a bottom field of a current frame and a top field of a next frame.

In element 82, exemplary embodiment 80 calculates a second magnitude of a motion vector between a top field of the current frame and a bottom field of the next frame.

In element 83, exemplary embodiment 80 compares the first magnitude against the second magnitude. If the first magnitude is larger than the second magnitude, then in element 84 the exemplary embodiment 80 indicates that the field order is bottom first. If the first magnitude is smaller than the second magnitude, then in element 85 the exemplary embodiment 80 includes that the field order is top first.

Figure 9:
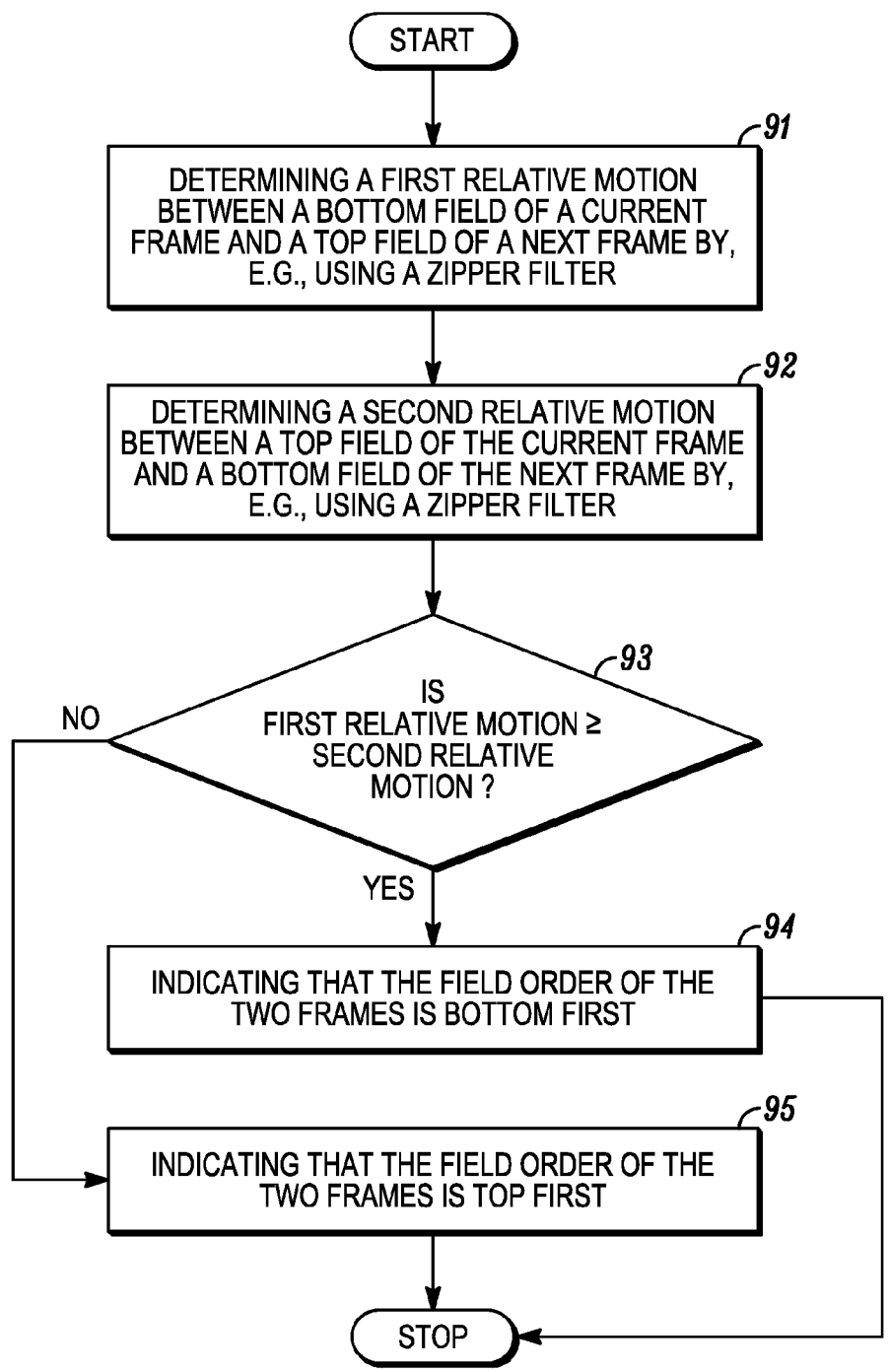
FIG. 9 depicts another exemplary embodiment of a method for detecting field order from two frames of a video sequence according to yet another aspect of the present invention.

Turning to FIG. 9, shown therein is another exemplary embodiment for determining field order of two video frames in a video sequence. There are many ways to measure "motion," such as using motion vector magnitude information. Note that compared to the approach outlined earlier where motion flow direction and magnitude were analyzed (e.g., (−1, +3, −1, +3, −1, +3, −1, . . . ) for incorrect field order), here only the relative motion magnitude is used.

Thus, in element 91, exemplary embodiment 90 calculates a first relative motion between a bottom field of a current frame and a top field of a next frame.

In element 92, exemplary embodiment 90 calculates a second relative motion between a top field of the current frame and a bottom field of the next frame.

In element 93, exemplary embodiment 90 compares the first relative motion against the second relative motion. If the first relative motion is larger than the second relative motion, then in element 94 the exemplary embodiment 90 indicates that the field order is bottom first. If the first relative motion is smaller than the second relative motion, then in element 95 the exemplary embodiment 90 includes that the field order is top first.

Figure 10:
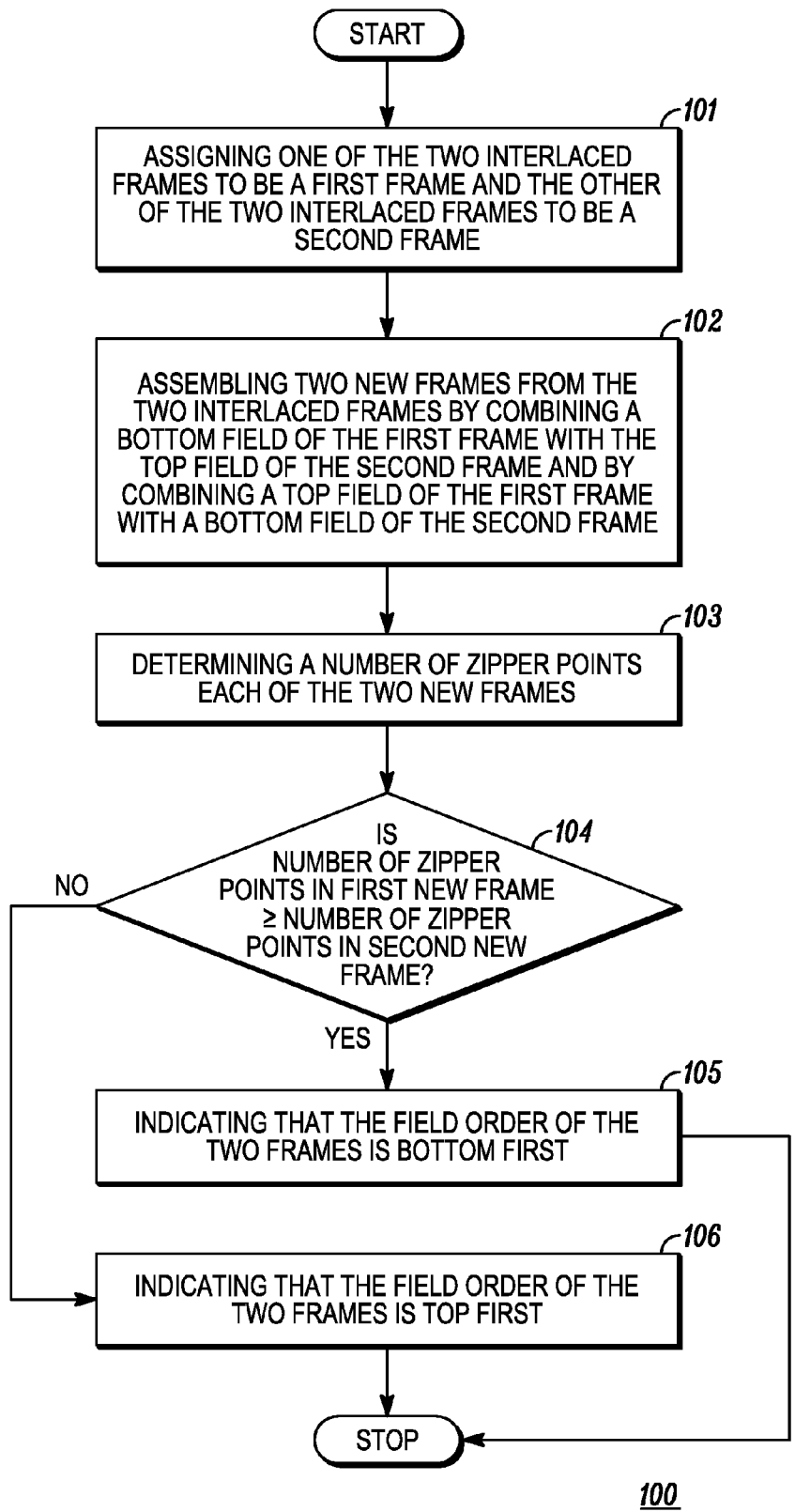
FIG. 10 depicts still another exemplary embodiment of a method for detecting field order from two frames of a video sequence according to yet another aspect of the present invention.

Turning to FIG. 10, shown therein is another exemplary embodiment of the present invention that employs the "zipper" filter approach described above for measuring the relative motion. Since the motion measurements are interfield motions between fields in a current and next frame, if these fields are assembled into a (hypothetical) new frame, interlaced "zigzag" or "zipper" artifacts will appear around edges of moving objects. These interfield artifacts should be more pronounced when the relative field motion is high. As a consequence, the "zipper" filter approach described above for interlaced detection can also be applied here. For example, if the (0t, 1b) frame is more "strongly interlaced" than the (0b, 1t) frame, then the top field is detected to be first. An outline of this approach is shown in FIG. 10:

1. Field order detection problem: Given an interlaced sequence of frames with known spatial resolution, determine whether the top or bottom field is temporally first in a frame. Thus, in element 101 the current frame is assigned to be a first frame and the next frame is assigned to be the second frame.

2. Let the current frame fields be (0t, 0b) and the next frame fields be (1t, 1b). Assemble two new (e.g., luminance) frames F1=(0b, 1t) and F2=(0t, 1b). Thus, in element 102, the exemplary embodiment 100 assembles the two new frames by combining the bottom field of the first frame with the top field of the second frame and the top field of the first frame with the bottom field of the second frame.

3. Determine the number of "zipper" points in F1 and F2 as z1 and z2, respectively. For example, this can be obtained by filtering each pixel in the frame using the shift-invariant (vertical) zipper filter $hz[n1,n2]$ shown in FIG. 1, and counting the number of output filtered absolute values above a specified threshold (T). This is performed in element 103.

4. If z1<z2, then the frames are detected to be top field first; otherwise, they are detected as bottom field first frames. The comparison is performed in element 104. The top field first determination is made in element 106, whereas the bottom field first determination is made in element 105.

The fact that there is a relative comparison between F1 and F2 eliminates the need for the second threshold P described above. (In fact, it may be possible to even eliminate the T threshold by perhaps simply comparing the sum of absolute values of the filtered output pixels of F1 and F2.) If z1=z2, then the frames can be determined to be either top field first or bottom field first. This method can be applied to a pair of frames, frame partitions, group of frames, or over the entire sequence. Also, the filtering operation is not computationally intensive, requiring only simple additions or subtractions in the above example. In addition to being useful for detecting field order of interlaced material, the exemplary embodiment can also be used on mixed interlace/progressive content such as 3:2 field pulldown material.

Field Order Detection on Telecine Content

Movie content recorded at 24 frames per second is usually processed using the telecine method to provide interlaced fields at 30 frames per second. If the original (24 fps progressive) movie frames are numbered 0, 1, 2, 3 . . . , the resulting interlaced sequence is composed of top and bottom fields in the following sequence (where fields within the same telecine frame are paired in square brackets, [ ])

top first=([0t, 0b], [0t, 1b], [1t, 2b], [2t, 2b], [3t, 3b], [4t, 4b], [4t, 5b], . . . ) and bottom first=([0b, 0t], [0b, 1t], [1b, 2t], [2b, 2t], [3b, 3t], [4b, 4t], [4b, 5t], . . . ).

We know that fields derived from the same movie frame were captured together and that the movie interframe period is 41.67 msec. Therefore the time differences (in units of conventional, 16.67 msec, inter-field time period) between telecine fields displayed in the correct order are correct order=(0, 0, +2.5, 0, +2.5, 0, 0, +2.5, 0, +2.5, 0 . . . ).

On the other hand, the time differences between fields displayed in the wrong order are incorrect order=(0, +2.5, −2.5, +5, −2.5, +2.5, 0, +2.5, 0, +2.5, 0 . . . ).

If we use the zipper filter, as before, to measure interfield motions between fields in a current and next frame, the apparent motion results from the following repeating pattern of interfield time differences between the second field of a current frame and the first field of the next frame:

TABLE 2

Interfield time differences between the second field of a current frame and the first field of the next frame over a 5 telecine frame repeat pattern (in units of conventional, 16.67 msec, inter-field time period).

| | frame number | | | | |
|---|---|---|---|---|---|
| | 0 | 1 | 2 | 3 | 4 |
| correct order | 0 | 0 | 0 | +2.5 | +2.5 |
| Incorrect order | +2.5 | +5 | +2.5 | +2.5 | +2.5 |

As shown in Table 2, 2 out of 5 frames are not likely to show a difference in displacement due to field order. However, the difference in displacement in the remaining 3 out of 5 frames is likely to be large. As a result, it is possible to distinguish the field order based a statistical analysis of the zipper filter output across a temporal set of frames. This chosen set size could be a multiple of the 5 frame repeat period of the interfield time differences.

Initial Results Using the Zipper Filter

Simulations of the proposed approach were performed on six interlaced sequences using the zipper filter and with T=3*75 (giving an average pairwise pixel edge step of 75/255≈29%). The sequence results are shown in Table 3. The number of zipper points z1 and z2 in a frame are expressed as percentages p1 and p2, respectively. Detection was based on comparing the mean measured values p1 and p2, and the initial results are promising. In these six sequences, the number of individual frames which were incorrectly detected ranged from 0-6 frames.

Simulations were also performed using the James field pulldown sequence to determine field order. At a sequence level, the results in the last row in Table 3 show that although the telecine content has only two interlaced frames for every five frames, the technique was still successful in determining the proper field order. At the frame level, the expected motion in Table 2 was observed, and the results are shown in Table 4. In this table, the measured percentage of zipper points, p1 and p2, are shown as indicators for interfield motion, and are averaged over a five-frame period. As indicated earlier, three out of five frames show a measurable difference in interfield motion, while this is not the case for the remaining two frames. Note that since the p1 row in Table 4 corresponds to the expected "correct motion" in Table 2, the sequence is detected as top field first. Otherwise, if the p2 row corresponded to the "correct motion" pattern, the sequence would have been detected to be bottom field first.

It is worth remarking that using this approach, not only can field order be determined, but it is also possible to use the detection information to perform inverse pulldown, independently of the scan format detection technique described above. More specifically, the second element in the p2 row in Table 4 shows a larger interfield motion than the other elements, reflecting the larger "+5" motion interval versus the "+2.5" interval of the other frames. In the absence of edits that may disturb the repeating five frame pattern, this pattern of zipper point percentages, p1 and p2, can be used to indicate the repeated fields that occur every second and fourth frames and that can be removed in order to invert the pulldown operation. Note that Table 2 expresses interfield motion in terms of time intervals whereas Table 4 indicates motion activity using zipper point percentages, so the numerical values between the two tables should not be directly compared. Instead, it is the corresponding pattern of values that can be used for detection and inverse pulldown.

The present invention has application at various points in an image/video communication system, such as in an image/video encoder, pre-processor, post-processor, or display system. On the display and post-processing side, it can be used to improve video quality delivery by determining whether the image/video material is better suited for an interlaced or progressive display, or by detecting whether de-interlacing is required before progressive display. For interlaced material, it can further detect what is the proper field order for display, as this is important for proper motion rendition. For image/video re-sizing, it can be used to indicate how the material should be re-sized, since interpolation and decimation algorithms for progressive and interlaced material can be quite different, producing drastically different and often poor results if not applied properly. On the encoder and pre-processor side, interlaced and field order detection can be used to increase coding efficiency by helping to detect pulldown (or telecine) material and "bad" field edit scene changes. It can also be used as a fast mode decision method to determine whether a given picture, or portion of a picture, should be coded using a progressive (frame) or interlaced (field) structure (as is supported in many compression standards).

SUMMARY

Outlined herein is a simple, fast, and fairly effective approach for automatically detecting whether video content is interlaced or progressive. It can be used in a variety of applications for pre-processing, compression, and post-processing. Furthermore, outlined herein are some simple methods for detecting field order using only the interlaced video data. It can be used to determine field order for compression applications, display purposes, or other applications where field timing is important. Simulations of one approach using the "zipper" filter for detection yielded promising results.

Although various embodiments are specifically illustrated and described herein, it will be appreciated that modifications and variations of the invention are covered by the above teachings and are within the purview of the appended claims without departing from the spirit and intended scope of the invention. For example, certain filter sizes are shown, however, other filter sizes could be used. Moreover, certain filter values are depicted, but others could be used. Furthermore, these examples should not be interpreted to limit the modifications and variations of the invention covered by the claims but are merely illustrative of possible variations.

The invention claimed is:

1. A method for determining a field order in a sequence of video frames stored in a memory, the method comprising:
    in a processor coupled to the memory, calculating a first magnitude of a motion vector between a bottom field of a current frame and a top field of a next frame;
    in the processor, calculating a second magnitude of a motion vector between a top field of the current frame and a bottom field of the next frame; and
    in the processor, determining the field order based on the first and second magnitudes.

2. The method according to claim 1, wherein the sequence of video frames has a top first field order if the first magnitude is smaller than the second magnitude.

3. The method according to claim 1, wherein the sequence of video frames has a bottom first field order if the first magnitude is larger than the second magnitude.

4. A method for determining a field order in a sequence of video frames stored in a memory, the method comprising:
    in a processor coupled to the memory, determining a first relative motion between a bottom field of a current frame and a top field of a next frame;
    in the processor, determining a second relative motion between a top field of the current frame and a bottom field of the next frame; and
    in the processor, determining the field order based on the first and second relative motions.

5. The method according to claim 4, wherein said determining the first relative motion and said determining the second relative motions includes using a zipper filter to measure the relative motions.

6. A method for determining a field order of two interlaced frames of a video sequence of frames stored in a memory, the method comprising:
    in a processor coupled to the memory, assigning one of the two interlaced frames to be a first frame and the other of the two interlaced frames to be a second frame;
    in the processor, assembling two new frames from the two interlaced frames by combining a bottom field of the first frame with the top field of the second frame and by combining a top field of the first frame with a bottom field of the second frame;
    in the processor, determining a number of zipper points each of the two new frames; and
    in the processor, determining if the number of zipper points in the first frame is smaller than the number of zipper points in the second frame, that the field order of the two frames is top field first.

7. The method according to claim 6, further comprising:
    determining if the number of zipper points in the first frame is larger than the number of zipper points in the second frame, that the field order of the two frames is bottom field first.

8. An apparatus for determining a field order in a sequence of video frames comprising:
    a memory; and
    a processor to receive the sequence of video frames, to store one or more frames in the memory to calculate a first magnitude of a motion vector between a bottom field of a current frame and a top field of a next frame, to calculate a second magnitude of a motion vector between a top field of the current frame and a bottom field of the next frame, and to determine the field order based on the first and second magnitudes.

9. An apparatus for determining a field order of two interlaced frames of a video sequence of frames comprising:
   a memory; and
   a processor to receive the sequence of video frames, to store one or more frames in the memory to assign one of the two interlaced frames to be a first frame and the other of the two interlaced frames to be a second frame, to assemble two new frames from the two interlaced frames by combining a bottom field of the first frame with the top field of the second frame and by combining a top field of the first frame with a bottom field of the second frame, to determine a number of zipper points each of the two new frames, to determine, if the number of zipper points in the first frame is smaller than the number of zipper points in the second frame, that the field order of the two frames is top field first, and to determine, if the number of zipper points in the first frame is larger than the number of zipper points in the second frame, that the field order of the two frames is bottom field first.

* * * * *